(12) United States Patent  
Schwarz et al.

(10) Patent No.: US 9,255,982 B2
(45) Date of Patent: Feb. 9, 2016

(54) APPARATUS AND METHOD FOR THE BINAURAL REPRODUCTION OF AUDIO SONAR SIGNALS

(75) Inventors: Jan-Philip Schwarz, Bremen (DE); Heiko Schmidt, Langwedel (DE)

(73) Assignee: ATLAS ELEKTRONIK GMBH, Bremen (DE)

(*) Notice: Subject to any disclaimer, the term of this patent is extended or adjusted under 35 U.S.C. 154(b) by 899 days.

(21) Appl. No.: 13/259,451

(22) PCT Filed: Apr. 26, 2010

(86) PCT No.: PCT/EP2010/055547
§ 371 (c)(1),
(2), (4) Date: Mar. 23, 2012

(87) PCT Pub. No.: WO2010/125029
PCT Pub. Date: Nov. 4, 2010

(65) Prior Publication Data
US 2012/0176865 A1   Jul. 12, 2012

(30) Foreign Application Priority Data

Apr. 29, 2009   (DE) .......................... 10 2009 019 405

(51) Int. Cl.
*G01S 15/00* (2006.01)
*G01S 3/808* (2006.01)
*G06F 3/01* (2006.01)
*H04S 7/00* (2006.01)

(52) U.S. Cl.
CPC .............. *G01S 3/8083* (2013.01); *G06F 3/012* (2013.01); *G06F 3/017* (2013.01); *H04S 7/304* (2013.01)

(58) Field of Classification Search
CPC ......... H04S 7/304; H04S 7/305; H04S 7/302; H04S 1/002; H04S 1/005; G01S 3/8083; G01S 7/5273; G06F 3/017; G06F 3/012; G06F 3/0236; G06F 3/0233; G06F 3/023; A61K 8/898; C08G 77/455; C08G 77/452; A61Q 5/06
See application file for complete search history.

(56) References Cited

U.S. PATENT DOCUMENTS 4,817,149 A   3/1989   Myers
5,647,016 A   7/1997   Takeyama
(Continued)

FOREIGN PATENT DOCUMENTS

DE   1566857 A1   4/1970
EP   0276159 A2   7/1988
(Continued)

OTHER PUBLICATIONS

Thompson FR 2 623 292 A1 English Translation.*
(Continued)

*Primary Examiner* — Luke Ratcliffe
*Assistant Examiner* — Amienatta M Ndure Jobe
(74) *Attorney, Agent, or Firm* — Fitch, Even, Tabin & Flannery LLP

(57) ABSTRACT

An apparatus and a method for the binaural reproduction of audio sonar signals, which can be direction-selectively received by a sonar system having a receiving antenna provided with a plurality of transducers, and at least one direction generator, and which can be modified by binaural audio signal processing. The apparatus comprises a portable sound reproduction device, particularly a headphone, and a head tracking sensor connected to the sound reproduction device for registering position changes of the sound reproduction device. Signals, associated with the position changes, are generated, which are transferred to the direction generator, in order to select a direction of the sound waves to be received.

17 Claims, 5 Drawing Sheets

(56) References Cited

U.S. PATENT DOCUMENTS

Figure 1:
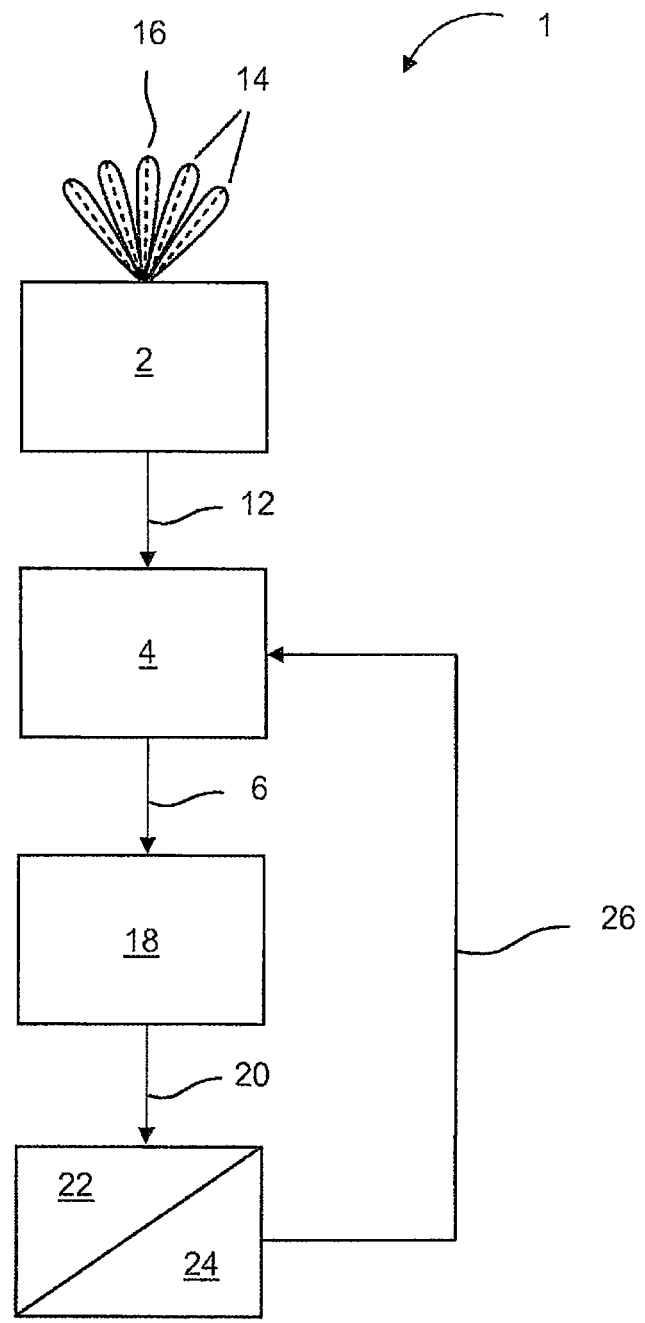

| | | |
|---|---|---|
| 2004/0174771 A1 | 9/2004 | Alinat |
| 2008/0136681 A1 | 6/2008 | Jeong et al. |
| 2011/0293129 A1* | 12/2011 | Dillen et al. .................. 381/370 |

FOREIGN PATENT DOCUMENTS

| | | |
|---|---|---|
| FR | 2623292 A1 * | 11/1987 |
| FR | 2623292 A1 | 5/1989 |

OTHER PUBLICATIONS

Arrabito et al; "Recommendations for Enhancing the Role of the Auditory Modality for Processing Sonar Data", Applied Acoustics, vol. 66, Aug. 1, 2005, pp. 986-1005, Elsevier Ltd.

Cook, Brian; "Uses of Spatial Audio in Sonar", Defence and Civil Institute of Environmental Medicine, Feb. 2002, pp. 1-39, DCIEM No. CR 2002-054.

Zeltzer et al; "Research on Improved Sonar Displays: A Human/Machine Processing System", Massachusetts Institute of Technology, Jun. 1995, entire document, The Research Laboratory of Electronics Technical Report No. 595.

Begault et al; "Direct Comparison of the Impact of Head Tracking, Reverberation, and Individualized Head-Related Transfer Functions on the Spatial Perception of a Virtual Speech Source", J. Audio Eng Soc, vol. 49, No. 10, Oct. 2001. pp. 904-916.

International Search report corresponding to International Application No. PCT/EP2010/055547 issued by the European Patent Office on Oct. 26, 2010.

* cited by examiner

APPARATUS AND METHOD FOR THE BINAURAL REPRODUCTION OF AUDIO SONAR SIGNALS

CROSS REFERENCE TO RELATED APPLICATION

This application is the National Stage filing under 35 U.S.C. 371 of International Application No. PCT/EP2010/055547, filed Apr. 26, 2010, and claims priority of German Patent Application No. 10 2009 019 405.3 filed Apr. 29, 2009, the subject matter of which in its entirety, is incorporated herein by reference

BACKGROUND OF THE INVENTION

The invention relates to an apparatus and a method for the binaural reproduction of audio sonar signals according to the preamble of claim 1 or 2 and 5 or 6.

Known sonar installations can be used to determine the position, speed and course of a destination by means of waterborne sound signals emitted from the destination. In this regard, the waterborne sound signals are conventionally received by means of a reception antenna which has a multiplicity of electroacoustic or optoacoustic transducers for receiving sound waves and producing electrical received signals.

In addition, a corresponding sonar installation has not only the reception antenna but also at least one beamformer, in which the received signals from the transducers are delayed on the basis of the arrangement of transducers on the antenna and are combined to form group signals or to form direction signals. Each direction signal has an associated principal reception direction, which can be pivoted by electronic measures, however.

DE 15 66 857 C3 discloses the processing of binaural information in audio sonar signals. For an operator (user) of a sonar installation, not only a visual presentation of the received signals or signals derived therefrom but also the acoustic reproduction of the received signals is relevant. The reason is that, in the case of acoustic observation of the waterborne sound signals from an observation sector of the sonar installation, missing direction information has a disadvantageous effect. This is because simultaneously hearing the signals from a multiplicity of directions ultimately results in interference which can cover a relatively weak signal from one particular direction. With appropriate direction information, however, the human hearing can distinguish sounds on the basis of their direction and hence can also differentiate soft sounds from different directions. This allows the performance capability of the operator to be increased by virtue of faster detection and classification of the destinations. In addition, the binaural information from the audio sonar signals makes it easier to distinguish closely adjacent destinations.

In addition, DE 15 66 857 C3 discloses the practice of taking the direction signals from the beamformer and generating a left and a right audio signal for reproduction via a binaural reproduction device, particularly headphones. To this end, a predetermined observation sector is sensed by means of the sonar installation, the center of said observation sector containing a principal listening direction pointing perpendicularly to the longitudinal axis of the reception antenna. The received signals from the sound sources which are situated to the left or right of this principal listening direction are weighted and/or delayed differently for forming the left audio signal and for forming the right audio signal in order to produce the binaural effect. This results in a listening impression which is different at the sides of the principal listening direction.

In a natural environment, humans unconsciously turn their head in order to ascertain the exact position of a sound source. These sometimes minimal head movements are important for natural hearing. In order to allow the operator to perceive the audio sonar signals satisfactorily from an acoustic point of view, however, it is not sufficient for the received signals to be separated on a right/left basis.

The invention is therefore based on the problem of improving the perception of audio sonar signals, particularly of providing a simple way for the operator to determine the hearing direction.

The invention solves this problem by means of an apparatus having the features of claims 1 and 2 and a method having the features of claims 5 and 6.

A reception antenna in a sonar installation is used by means of a multiplicity of electroacoustic or optoacoustic transducers to receive waterborne sound signals and to produce electrical received signals. The reception antennas used in this context are linear antennas, cylinder bases or conformal antennas, for example. In the case of linear antennas, the transducers are arranged regularly along a straight line. In the case of a cylinder base, the transducers are arranged circularly. Conformal antennas include horseshoe bases, for example. At least one downstream beamformer is used to receive sound waves on a directionally selective basis.

The direction signals from the beamformer or the beamformers are produced by delaying the timing of the received signals from the transducers on the reception antenna differently in accordance with a principal reception direction associated with a direction signal and summing them in phase, possibly taking account of an amplitude stagger. In this case, the timing delay is dependent not only on the desired principal reception direction but also on the arrangement of the transducers on the reception antenna.

The sonar installation is used to sense a predetermined observation sector and to acoustically map it onto a mapping sector. To this end, one or more associated direction signals is/are selected and possibly summed, specifically such that two summed signals are formed corresponding to a left audio signal and a right audio signal. In this case, the selected direction signal or the summed selected direction signals is/are delayed and/or weighted differently according to the listening direction for the left and for the right audio signal.

Preferably, the principal reception directions associated with the direction signals are situated in a (two-dimensional) horizontal acoustically monitored observation plane in three-dimensional space. Hence, a direction for a sound source in the real space is projected, preferably perpendicularly, into the observation plane, and the observation sector is acoustically mapped onto a two-dimensional mapping plane.

A sound source in the observation plane is located by processing binaural information to produce the audio sonar signal. Two important binaural features are the interaural time difference (ITD) and the interaural level difference (ILD). These determine the lateral direction of incidence of the sound signal. In this case, the ITD describes the delay difference and the ILD describes the level difference for the sound signal between the two ears. These binaural features can be used to recreate the attenuation response of the human hearing and the orientation of the human ears relative to a sound source. When the audio signals are reproduced by means of headphones, the operator is provided with the impression that he is looking or listening in the principal listening direction and is perceiving incoming waterborne sound signals as airborne sound signals via both ears. Appropriate weighting and/or delaying of the incoming direction signals can therefore produce a two-dimensional acoustic hearing impression. In this case, both the weighting and the delaying of the direction signal or of the direction signals are effected on the basis of the position of the chosen principal listening direction.

In line with the invention, two direction signals for the binaural reproduction of audio sonar signals are formed, specifically a respective direction signal for one of the two audio channels. Suitable delaying and summation of the received signals from the transducers of the reception antenna produce two direction signals by means of the beamformer. In this case, the two direction signals are produced such that they have two different acoustic centroids which are at an interval from one another, but the respective associated principal reception directions run parallel to one another. In this case, these direction signals are produced by combining respective different groups of transducers. Hence, stereo sound pickup is advantageously already effected in water.

The sound signals from a sound source arrive on the transducers at different times and produce a stereo impression as a result of the delay difference and level difference. If a sound signal is received precisely from the center of the two direction signals, however, the signal is distributed identically. The listener perceives the sound source as being precisely from the center.

An independent aspect of the invention relates to the insight that humans have the opportunity for direction formation using their own body. They are able to determine the direction of a sound source by virtue of—possibly even only small—head movements. When the two-dimensional audio signal is reproduced using headphones, however, the problem arises that the sound source follows the head movements. The invention therefore provides electronic sensing of the head movements of the operator. What is known as a head tracking sensor, i.e. a sensor for detecting or sensing head movements, in a portable sound reproduction device, particularly headphones, is used to sense changes in the position of said sound reproduction device.

Preferably, the head tracking sensor has an acceleration sensor. This senses accelerations in movements of the sound reproduction device or of the head of the operator who is carrying the sound reproduction device. This makes it possible to ascertain changes in position and, when a starting position is used, hence also a precise position for the sound reproduction device or for the head. The advantage of using an acceleration sensor is that no external reference system is needed. Advantageously, the acceleration sensor is connected telemetrically to the sonar system so that the operator has unrestricted freedom of movement. Advantageously, the acceleration sensor is a 3D acceleration sensor, i.e. a sensor which can sense accelerations in all spatial directions. Preferably, it is also capable of sensing rotary accelerations.

It is therefore advantageously possible to select a direction for the principal listening direction of the sonar installation. To this end, the head tracking sensor has an interface which is designed such that the measurement data captured by the head tracking sensor are transmitted to the sonar installation. Therefore, the audio signals are generated on the basis of movement and/or positional data from the head tracking sensor and hence from the head for the purpose of improved acoustic perception.

In a further embodiment of the invention, the signals which are caused by different movements of the sound reproduction device each control different functions. Primarily, the sensing of the head movements is used for direction selection of the principal listening direction for the sonar installation. If the head tracking sensor is able to sense further movements as measurement data, the signals from the head tracking sensor can have predetermined functions assigned to them.

There are six degrees of freedom available for describing the head movements—three translational degrees of freedom and three rotational degrees of freedom. It is therefore possible to control six different functions by means of the head movement. Exemplary possibilities would be pointer movements on a display or zooming-in by an audio magnifier, i.e. synthetic spreading of the mapping sector.

In a further embodiment of the invention, an input device is provided. This may be an eye tracker, a touch screen or any other device which can be used to produce a signal.

For the direction selection by means of head movement, an input device which can be used to produce a signal is first of all used to make a coarse preliminary selection for the listening direction. This signal from the input device is transferred to the sonar installation as a starting signal and is used to stipulate a starting position for the head tracking sensor. Hence, a principal listening direction which can be pivoted relative to a reference direction which is fixed in relation to the reception antenna is stipulated, or an observation sector is selected. When the head tracking sensor subsequently moves within the horizontal plane, sound sources which are present can be located within a predetermined observation sector.

Figure 2:
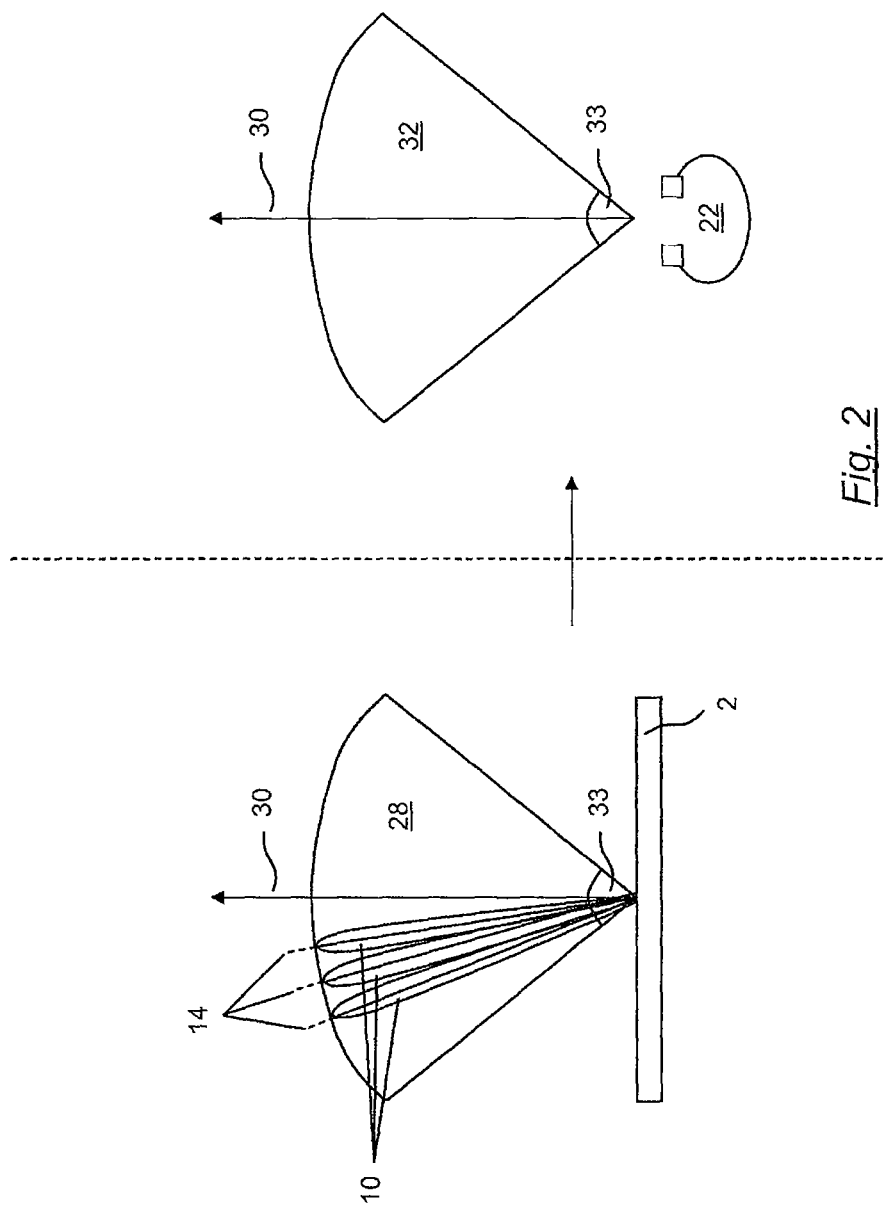
Figure 3A:
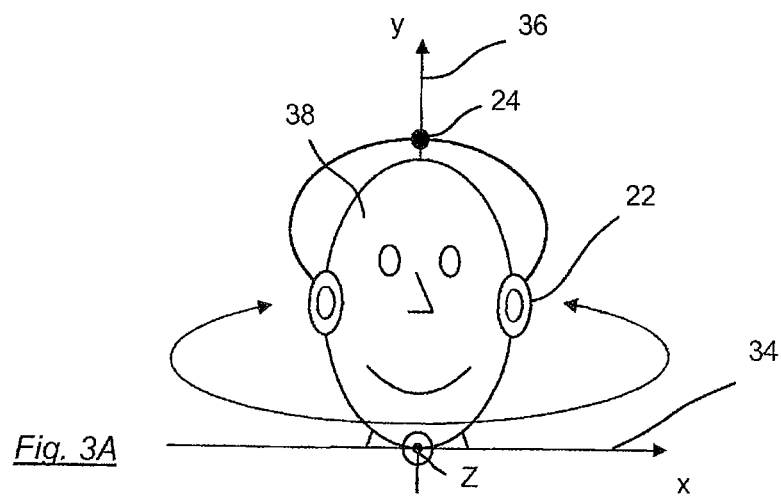
Figure 3B:
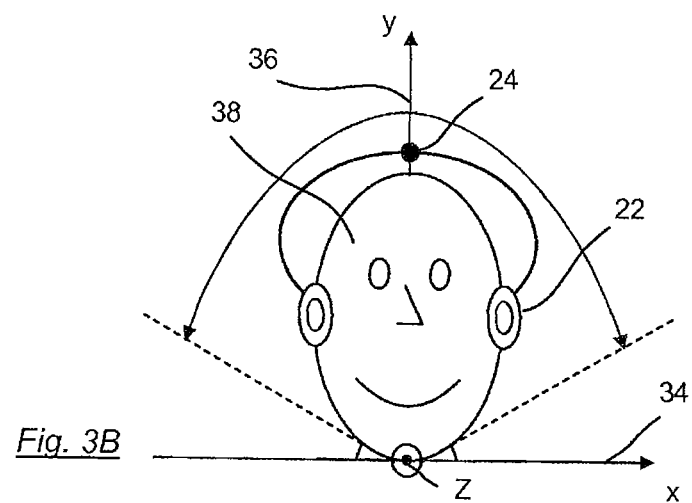
Figure 3C:
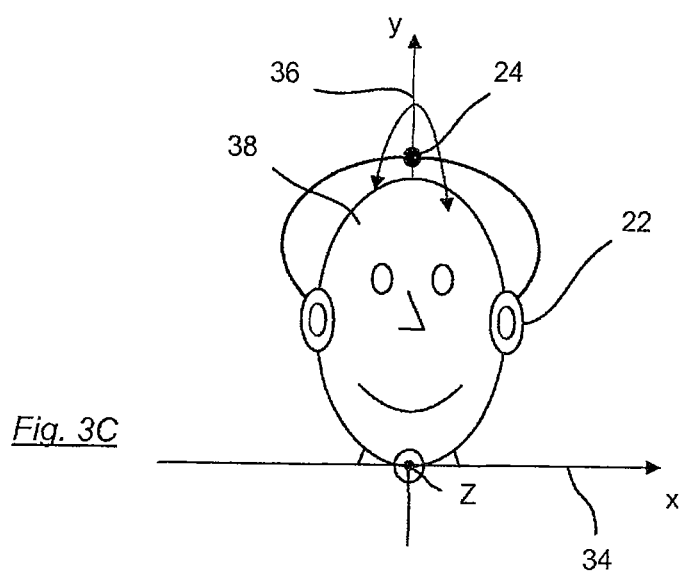
Figure 4A:
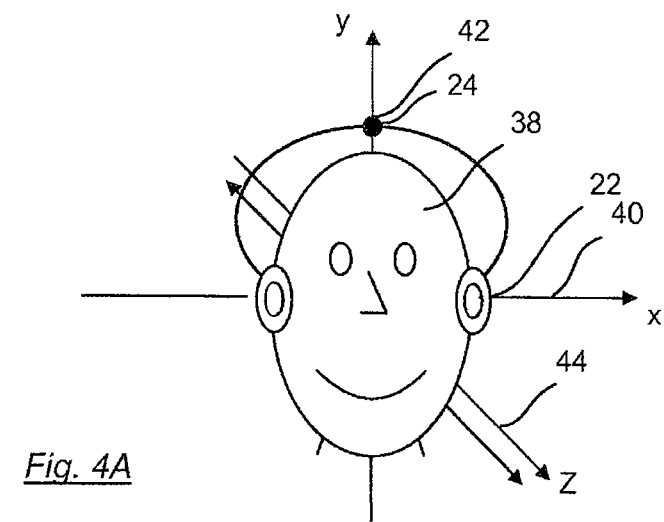
Figure 4B:
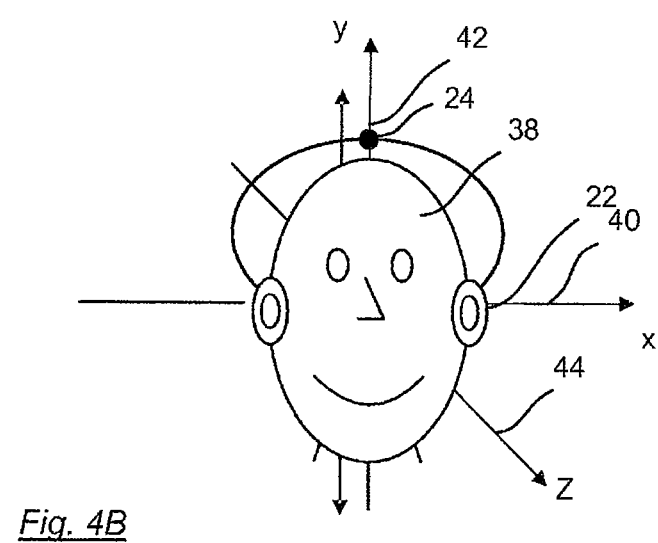
Figure 4C:
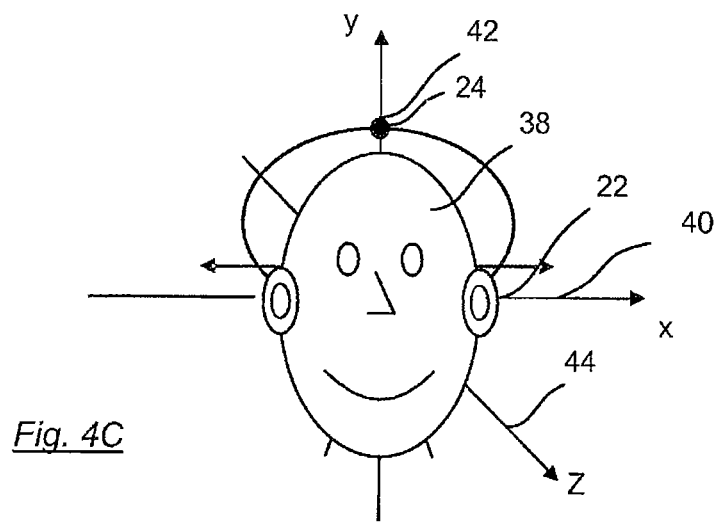
Figure 5:
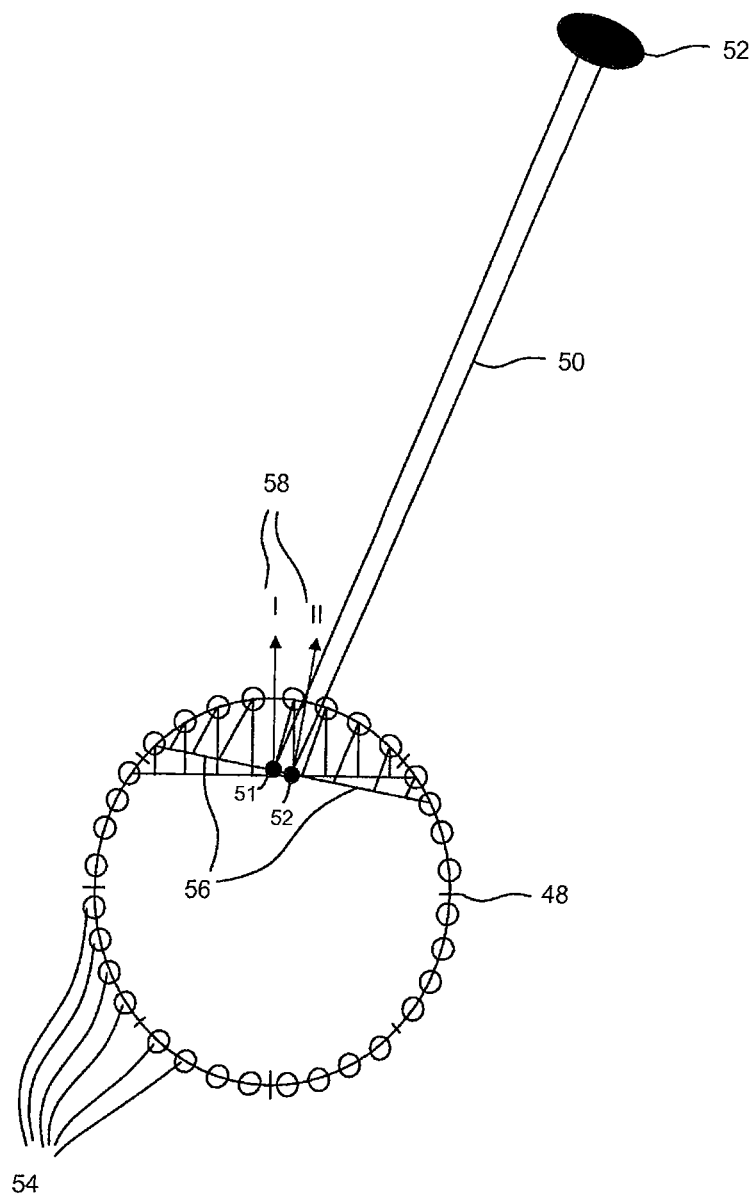

Further advantageous embodiments can be found in the subclaims and in the exemplary embodiments which are explained in more detail with reference to the appended drawing, in which:

FIG. 1 shows a block diagram to illustrate the manner of operation for binaural reproduction of audio sonar signals, FIG. 2 shows a representation of an observation sector, FIGS. 3A-C show the possible degrees of rotational freedom for a head movement, FIGS. 4A-C show the possible degrees of translational freedom for a head movement, and FIG. 5 shows a cylinder base for stereo sound pickup in water.

FIG. 1 shows a block diagram to illustrate the manner of operation for binaural reproduction of audio sonar signals.

A sonar installation 1 (shown only in part) has a reception antenna 2, which has a multiplicity of electroacoustic and/or optoacoustic transducers, with at least one downstream beamformer 4, which can receive the sound waves on a directionally selective basis and can produce electrical received signals 6.

Direction signals associated with directional characteristics 10 are produced by delaying the timing of the received signals 12 from the transducers on the reception antenna 2 and summing them in phase. In this case, each direction signal has an associated principal reception direction. The delaying of the timing of the received signals 12 is in this case dependent on the desired principal reception direction and the geometry of the reception antenna 2 and particularly of the arrangement of the transducers on the reception antenna 2. For a particular principal reception direction, the timing delay between two adjacent transducers is chosen specifically such that it corresponds to the delay with which a wavefront coming from a principal reception direction arrives at two adjacent transducers.

The axes 14 of the directional characteristics 10 represent the principal reception directions thereof. They are determined by a horizontal pivot angle relative to a reference direction 16 which is fixed for the antenna, and can be varied electronically by altering the timing delays for the received signals, i.e. by timing delay coefficients.

Direction signals for selected directional characteristics 10 are transferred to an audio signal processing unit 18. This takes one or more direction signals and generates binaural audio signals 20, which are weighted and/or delayed in accordance with a desired listening direction and, when there are a plurality of direction signals to be processed, are summed separately for each of the two audio signals for the left and right channels. They are reproduced by means of a portable sound reproduction device 22. The sound reproduction device 22 is connected to a head tracking sensor 24 for the purpose of sensing movements of the sound reproduction device 22. In the present case, it is assumed that the sound reproduction device 22 is headphones, for example, which are worn on the head by an operator. The further statements therefore relate to the head of the operator.

The head tracking sensor 24 is capable of using an appropriate algorithm to determine the current position of the head of the operator. It has a 3D acceleration sensor which produces appropriate signals 26 which are associated with the positions of the head. These signals 26 are transferred to the beamformer 4, which then takes these signals 26 as a basis for making a fresh selection of the direction signals which corresponds to the current head position.

The invention is not limited to selection of individual direction signals, however. On the contrary, it is likewise possible to select direction signals in groups, which are processed by means of the audio signal processing unit 18 to produce a right and a left audio signal 20.

FIG. 2 shows a representation of an observation sector 28 which is formed by the selected directional characteristics 10. In the center, there is a principal listening direction 30 pointing perpendicularly to the longitudinal axis of the reception antenna 2. This observation sector 28 is acoustically mapped onto a mapping sector 32. In this exemplary embodiment, the observation sector 28 and the mapping sector 32 have the same aperture angle 33.

If a sound source is in the center of the observation sector 28, then the direction signal associated with the principal listening direction 30 is processed by means of the audio signal processing unit 18, and the left and right audio signals 20 are essentially identical. If the sound source is to the left or right of the principal listening direction 30, then the left and right audio signals 20 are formed by weighting and/or delaying the relevant direction signal(s) in order to produce two different audio signals 20 for the two ears in accordance with the natural hearing impression.

While the principal listening direction 30 of the mapping sector 32 is always in the center thereof, it can be pivoted in the observation plane 28. According to the invention, the principal listening direction 30 can advantageously be controlled by means of a head movement.

To describe the movement of the head in space, a fixed coordinate system is used. Preferably, this is a Cartesian coordinate system. The movement of the head has three degrees of rotational freedom and, depending on the training condition of the cervical spine, one, two or three degrees of translational freedom.

FIGS. 3A-C show the possible degrees of rotational freedom for a head movement. The x axis 34 describes a horizontal axis and the y axis 36 describes a vertical axis.

FIG. 3A shows a rotary movement for a head 38 about the y axis 36. This movement is provided in accordance with the invention for determining the direction of the principal listening direction. The signals 26 produced by this movement are transferred to the beamformer 4 for the purpose of selecting those direction signals 10 which are output via the headphones 22 downstream of an audio signal processing unit 18.

Since the head tracking sensor 24 of the portable sound reproduction device 22 contains a 3D acceleration sensor, it is possible to sense further movements.

In FIG. 3B, the head 38 describes a tilting movement from left to right or from right to left about a z axis which is perpendicular to the plane of the drawing. This movement produces signals 26, which can, by way of example, control left/right movements (or right/left movements) of a pointer on a display, for example in order to coarsely actuate or select a principal listening direction or an observation sector.

FIG. 3C shows a rotary or nodding movement of the head 38 about the x axis 34. This nodding movement is provided for a selection function, for example. Following a pointer movement on the display in accordance with the movement shown in FIG. 3B, it is thus possible to make a selection by nodding the head 38 in accordance with the movement shown in FIG. 3C, for example.

FIGS. 4A-C show the possible degrees of translational freedom for a head movement. The figures show the head 38 and a Cartesian coordinate system comprising an x axis 40, a y axis 42 and a z axis 44. The 3D acceleration sensor is capable of sensing not only the rotary or nodding or tilting movements shown in FIGS. 3A-C but also translational movements in the direction of the three coordinates.

In FIG. 4A, the head 38 describes a movement along the z axis 44. This forward and back movement of the head 38 is provided for a zoom-in function of an audio magnifier, for example. When an observation sector 28 is acoustically mapped onto a mapping sector 32 at 1:1, the aperture angle 33 of the observation sector 28 corresponds to the aperture angle 33 of the mapping sector 32. However, provision is advantageously made for the aperture angle 33 of the mapping sector 32 to be chosen to be greater or less than the aperture angle 33 of the observation sector 28 by a spread factor $\Psi$. This allows an acoustic magnifier or an acoustic reduction means to be provided. The advantage is more precise direction resolution within an observation sector 28, the aperture angle 33 of which is less than the aperture angle 33 of the mapping sector 32. It is therefore possible to establish whether a single sound source or a plurality of sound sources is/are involved. The signals 26 from the head tracking sensor 24 which are produced by the head movement are transferred to an audio signal processing unit 18 in order to determine the spread factor $\Psi$ using the head movement.

FIGS. 4B and C describe two further possible degrees of freedom for the head movement; FIG. 4B describes a movement in the direction of the y axis 42 and FIG. 4C describes a movement in the direction of the x axis 40. Since these movements can also be sensed by means of the 3D acceleration sensor, appropriate function assignment is possible. However, an up/down movement and a right/left movement of the head 38 is dependent on the mobility of the head of an operator.

The method described above can be modified to the extent that stereo sound pickup is already effected in water.

FIG. 5 shows a cylinder base 48 for producing two directional characteristics 10, the principal reception directions 50 of which run parallel to one another, but have been swiveled relative to the respective line of symmetry I or II for a selected group of transducers 54. In this way, the principal reception directions 50 can be oriented to the same destination 52.

A directional characteristic 10 is formed by using a respective group of transducers 54 on the reception antenna 2. If these transducers 54 are arranged circularly, as in the case of cylinder base 48, for example, the received signals 12 from the transducers 54 can be delayed for each group as though the transducers 54 were arranged on the respective associated chord 56. This chord 56 is situated perpendicular to the line of symmetry I or II of the respective group. In this case, the principal reception directions run along the respective lines of symmetry. Hence, the principal reception directions would not run parallel to one another, however. Therefore, the received signals 12 from the transducers 54 need to be delayed in another way, specifically such that the principal reception directions of two different transducer groups run parallel to one another.

The invention is not limited to cylinder bases 48. In alternative embodiments, other reception antennas 2, such as horseshoe bases or linear antennas, are used. Other antenna arrangements are treated on the basis of the same principle. However, it is always necessary to take account of the geometric arrangement of the transducers 54.

The head 34 of the operator has two natural signal sensors by virtue of the ears. Separate calculation of the direction signals for the two signal sensors recreates a natural acoustic sense of hearing. A binaural audio sonar signal 20 is produced by using the beamformer 4 to form two directional characteristics 10 with transducer groups with different acoustic centroids S1 and S2 which are at an interval from one another. To this end, a respective number of transducers 54 is combined to form two groups and the received signals 12 therefrom are delayed such that two direction signals are produced with respective principal reception directions 50 running parallel to one another. In order to be able to direct both directional characteristics at the same destination 52, the principal reception directions 50 of said directional characteristics must not cross, or must cross only at a maximum reception distance. Therefore, the principal reception directions 50 are swiveled electronically such that they have an essentially parallel course. As a result, these direction signals already contain the binaural information such as delay difference and level difference and are transferred to two channels of the audio signal processing unit 18. The latter contains filters, such as equalizers and the like, in order to suppress noises, for example.

When the head of the operator moves to determine a direction, the chords 56 are swiveled on the cylinder base 48 accordingly. Further fine direction finding is undertaken by the operator by means of the opportunity for using his own body to form a direction. A head tracking sensor 24 therefore allows even better resolution of direction finding.

All the features cited in the aforementioned description of the figures, in the claims and in the introductory part of the description can be used either individually or in arbitrary combination with one another. The invention is therefore not limited to the feature combinations which are described or claimed. On the contrary, all feature combinations can be considered to have been disclosed.

The invention claimed is:

1. An apparatus for the binaural reproduction of audio sonar signals (20) which can be generated by means of a sonar installation with a reception antenna (2), having a multiplicity of electroacoustic and/or optoacoustic transducers (54), with at least one downstream beamformer (4) for the directionally selective reception of sound waves and production of electrical or optical received signals (6) and which can be modified by means of a binaural audio signal processing unit (18), wherein
the beamformer (4), which is designed to produce two direction signals with respective associated mutually parallel principal reception directions (50) and acoustic centroids (S1, S2) which are arranged at an interval from one another,
a portable sound reproduction device (22),
a head tracking sensor (24) for sensing changes in the position of the portable sound reproduction device (22),
the head tracking sensor (24) having an acceleration sensor for sensing accelerations in movements of the portable sound reproduction device (22),
wherein the head tracking sensor (24) can produce signals (26) associated with the changes in the position of the portable sound reproduction device (22), and
the signals (26) produced can be used by means of the beamformer (4) to select a direction for the sound waves that are to be received.

2. The apparatus as claimed in claim 1, wherein an input device is for selecting a starting position for the portable sound reproduction device (22).

3. The apparatus as claimed in claim 2, wherein said starting position comprises a pivotable principal listening direction (30) for the reception antenna (2) and/or an observation sector (28) of the sonar installation.

4. The apparatus as claimed in claim 1, wherein, in addition to the direction selection, said apparatus includes controls for further functions by means of the signals (26) from the head tracking sensor (24).

5. The apparatus as claimed in claim 4, wherein the apparatus includes a display and signals (26) from the head tracking sensor (24) control pointer movements on the display and zooming-in by an audio magnifier.

6. The apparatus as claimed in claim 1, wherein said portable sound reproduction device (22) comprises headphones.

7. The apparatus as claimed in claim 1, wherein said apparatus further comprises a display, said display capable of displaying point movements controlled by means of the signals (26) from the head tracking sensor (24).

8. The apparatus as claimed in claim 1, wherein said apparatus further comprises a display, said display capable of zooming-in by an audio magnifier controlled by means of the signals (26) from the head tracking sensor (24).

9. A method for the binaural reproduction of audio sonar signals (20) which are generated by means of a sonar installation with a reception antenna (2), having a multiplicity of electroacoustic and/or optoacoustic transducers (54), with at least one downstream beamformer (4) for the directionally selective reception of sound waves and production of electrical or optical received signals (6) and which are modified by means of a binaural audio signal processing unit (18), using the beamformer (4), said method comprising
producing two directional characteristics (10) with respective associated mutually parallel principal reception directions (50) and acoustic centroids (S1, S2), which are arranged at an interval from one another,
sensing changes in the position of a portable sound reproduction device (22) by means of a head tracking sensor (24), said head tracking sensor (24) having an acceleration sensor for sensing accelerations in movements of the sound reproduction device (22),
producing signals (26) by means of the head tracking sensor (24) that are associated with the changes in the position of the portable sound reproduction device (22), and
selecting a direction for the sound waves that are to be received by means of the beamformer (4) using the signals (26) produced.

10. The method as claimed in claim 9, wherein said method further comprises selecting a starting position for the portable sound reproduction device (22) by means of an input device.

11. The method as claimed in claim 10, wherein said apparatus includes the signals (26) from the head tracking sensor (24) control further functions in addition to the direction selection, particularly pointer movements on a display and/or zooming-in by an audio magnifier.

12. The apparatus as claimed in claim 10, wherein said input device comprises an eye tracker or a touch screen.

13. The method according to claim 10, wherein said starting position comprises at least one of a pivotable principle listening direction (30) for reception antenna (2) at an observation sector (28) of the sonar installation.

14. The method as claimed in claim 9, wherein the signals (26) from the head tracking sensor (24) control further functions in addition to the direction selection, particularly pointer movements on a display and/or zooming-in by an audio magnifier.

15. The method as claimed in claim 9, wherein said portable sound reproduction device (22) comprises headphones.

16. A system for binaurally reproducing audio sonar signals comprising a sonar installation including a multiplicity of acoustic transducers, a reception antenna to receive waterborne sound signals from said acoustic transducers and to produce electrical received signals, a binaural signal processing unit, at least one downstream beamformer to receive sound waves on a directionally selective basis, to produce signals that can be modified by means of said binaural signal processing unit, said beamformer producing two directional signals with associated mutually parallel principal reception directions and acoustic centroids arranged at an interval from one another, a portable sound reproduction device, a head tracking sensor portable to sense changes in the position of the sound reproduction device, said head tracking sensor further comprising an acceleration sensor to sense accelerations in movements of the portable sound reproduction device, said head tracking sensor producing signals associated with changes in the position of said portable sound reproduction device, and said beamformer selecting a direction for the sound waves that are to be received using said signals produced by said head tracking sensor.

17. The system according to claim 16, wherein said two directional signals are produced by combining respective groups of transducers to effect stereo sound pick-up, magnifier controlled by means of the signals (26) from the head tracking sensor (24).

* * * * *